US009570193B2

(12) United States Patent
Erickson et al.

(10) Patent No.: US 9,570,193 B2
(45) Date of Patent: Feb. 14, 2017

(54) IMPLEMENTING HIDDEN SECURITY KEY IN EFUSES

(71) Applicant: International Business Machines Corporation, Armonk, NY (US)

(72) Inventors: Karl R. Erickson, Rochester, MN (US); Phil C. Paone, Rochester, MN (US); David P. Paulsen, Inver Grove Heights, MN (US); John E. Sheets, II, Zumbrota, MN (US); Gregory J. Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 14/572,970

(22) Filed: Dec. 17, 2014

(65) Prior Publication Data
US 2016/0180961 A1 Jun. 23, 2016

(51) Int. Cl.
*G11C 17/16* (2006.01)
*G11C 17/18* (2006.01)
*G06F 21/79* (2013.01)
*G11C 29/04* (2006.01)
*G11C 29/50* (2006.01)
*G11C 29/54* (2006.01)
*G11C 29/44* (2006.01)

(52) U.S. Cl.
CPC ............... *G11C 17/18* (2013.01); *G06F 21/79* (2013.01); *G11C 17/16* (2013.01); *G11C 29/04* (2013.01); *G11C 29/50012* (2013.01); *G11C 29/54* (2013.01); *G11C 2029/4402* (2013.01)

(58) Field of Classification Search
CPC ....... G11C 17/16; G11C 17/18; H01L 23/5252
USPC ............. 365/96, 225.7, 93, 194, 185.11
See application file for complete search history.

(56) References Cited

U.S. PATENT DOCUMENTS

| 4,189,766 | A | 2/1980 | Horiguchi et al. |
|---|---|---|---|
| 4,580,279 | A | 4/1986 | Kahn |
| 7,461,268 | B2 | 12/2008 | Drehmel et al. |
| 8,391,489 | B2 | 3/2013 | Paksoy et al. |
| 8,456,187 | B2 | 6/2013 | Erickson et al. |
| 2003/0122582 | A1 | 7/2003 | Samaan |
| 2005/0041803 | A1 | 2/2005 | Chateau et al. |
| 2007/0274118 | A1* | 11/2007 | Audy ............ G11C 17/16 365/96 |
| 2012/0216050 | A1 | 8/2012 | Barner et al. |

OTHER PUBLICATIONS

Appendix P—List of IBM Patents or Patent Applications Treated As Related—May 3, 2015.
(Continued)

*Primary Examiner* — Jason Lappas
(74) *Attorney, Agent, or Firm* — Joan Pennington

(57) ABSTRACT

A method and circuit for implementing a hidden security key in Electronic Fuses (eFuses), and a design structure on which the subject circuit resides are provided. The circuit includes a race condition circuit coupled to a latching structure. The race condition circuit is characterized including respective driver strengths of each stage in the race as well as a sampling clock during chip testing. The data is used to store drive strengths for each stage in eFuses and is used to get a logical one or logical zero out of the final latching stage of the race condition circuit.

15 Claims, 8 Drawing Sheets

(56) References Cited

OTHER PUBLICATIONS

Rizzolo, R.F. et al., "IBM System z9 eFUSE applications and methodology." IBM Journal of Research and Development, vol. 51, No. 1-2, 2007, pp. 65-75.
Takaoka, H. et al., "A novel via-fuse technology featuring highly stable blow operation with large on-off ratio for 32nm node and beyond," IEEE International Electron Devices Meeting, IEDM, 2007, pp. 43-46.
Rosenblatt, S. et al., "A Self-Authenticating Chip Architecture Using an Intrinsic Fingerprint of Embedded DRAM," IEEE Journal of Solid-State Circuits, vol. 48, No. 11, 2013, pp. 2934-2943.

* cited by examiner

EDGE-TRIGGERED D-LATCH
FLIP FLOP 204

| CLK | D | DATABIT |
|---|---|---|
| 0 | 0 | LATCH |
| 0 | 1 | LATCH |
| 1 | 0 | 0 |
| 1 | 1 | 1 |

EDGE-TRIGGERED
D-LATCH FLIP FLOP 504

| CLK | D | DATABIT |
|---|---|---|
| 0 | 0 | LATCH |
| 0 | 1 | LATCH |
| 1 | 0 | 0 |
| 1 | 1 | 1 |

US 9,570,193 B2

1

IMPLEMENTING HIDDEN SECURITY KEY IN EFUSES

FIELD OF THE INVENTION

The present invention relates generally to the data processing field, and more particularly, relates to a method and circuit for implementing hidden security key in Electronic Fuses (eFuses), and a design structure on which the subject circuit resides.

DESCRIPTION OF THE RELATED ART

Because eFuse design requires a physical change to be made in the silicon or metal layers of the chip it is possible to delayer a chip and visibly read the data store in an eFuse macro. Recently a game manufacturer reported that chip pictures of its game had appeared on the internet. These pictures have also been labeled with memory types and sizes and the eFuse macro was one of the memory areas properly labeled. The game manufacturer reported concern that given the ability to see the state of a fuse visually their security data could now be at risk.

A need exists for a circuit having an enhanced mechanism for storing security communication keys or other sensitive data that effectively avoids security breach.

SUMMARY OF THE INVENTION

Principal aspects of the present invention are to provide a method and circuit for implementing a hidden security key in Electronic Fuses (eFuses), and a design structure on which the subject circuit resides. Other important aspects of the present invention are to provide such method, circuit and design structure substantially without negative effects and that overcome many of the disadvantages of prior art arrangements.

In brief, a method and circuit for implementing a hidden security key in Electronic Fuses (eFuses), and a design structure on which the subject circuit resides are provided. The circuit includes a race condition circuit coupled to a latching structure. The race condition circuit is characterized including respective driver strengths of each stage in the race as well as a sampling clock during chip testing. The data is used to store drive strengths for each stage in eFuses and is used to get a logical one or logical zero out of the final latching stage of the race condition circuit.

In accordance with features of the invention, the race condition circuit is designed to be sensitive to chip variations to ensure for example that out of ten chips at least two will have different data using the same strength inputs.

In accordance with features of the invention, the race condition circuits are built in groups of three and the results are determined by a majority vote, thus allowing the design to be reliable while still having the race condition sensitive to different manufacturing variations.

In accordance with features of the invention, the method does not store the data directly where it can be read visibly from the eFuses but instead the strength conditions are stored into a circuit in order to get the correct data out of the circuit, thus creating a visibly-secure data storage method.

In accordance with features of the invention, to reverse engineer the data, the eFuse macro must be delayered and read. On a different chip the race condition circuit must be characterized, the data and eFuse drive strengths data must be mapped and then the data must be traced to its functional location. Because all of these steps can require several chips

2 to be purchased and some chips will give you a different answer than others the work required to read the secure information has been exponentially increased.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuits for implementing hidden security key in Electronic Fuses (eFuses), and a design structure on which the subject circuit resides are provided. During chip testing, the race circuit and latch are characterized. The chip is able to vary the drive strengths of each of the stages in the two racing delay paths as well as the drive strengths of the clock delay line, for example, by turning on and off extra PFETs and NFETs in the inverters. This will cause the input data and capture clock pulse to vary in size as well as arrival time. Changing what part of the input signal is captured, the output data is programmed to be a logical one or zero. After the circuit is characterized, the conditions that produce reliable logical ones and zeros are recorded. The eFuses are programmed with these conditions instead of directly storing each bit of the sensitive data. The conditions are read out, the differing strengths are implemented, and the input pulse is sent down the two racing paths and the capture clock path. The result then is captured into a latch. This process is repeated for three different race and latching circuits in order to have a voting circuit to ensure reliable data output. Each of the three race circuits will be activated until all of the voting racing paths have been recorded. The vote then takes place and the final sensitive bit of information is stored into a volatile memory cell. This will continue until the entire string of secure data has been read and stored to be used by the system on a chip (SOC).

Figure 1:
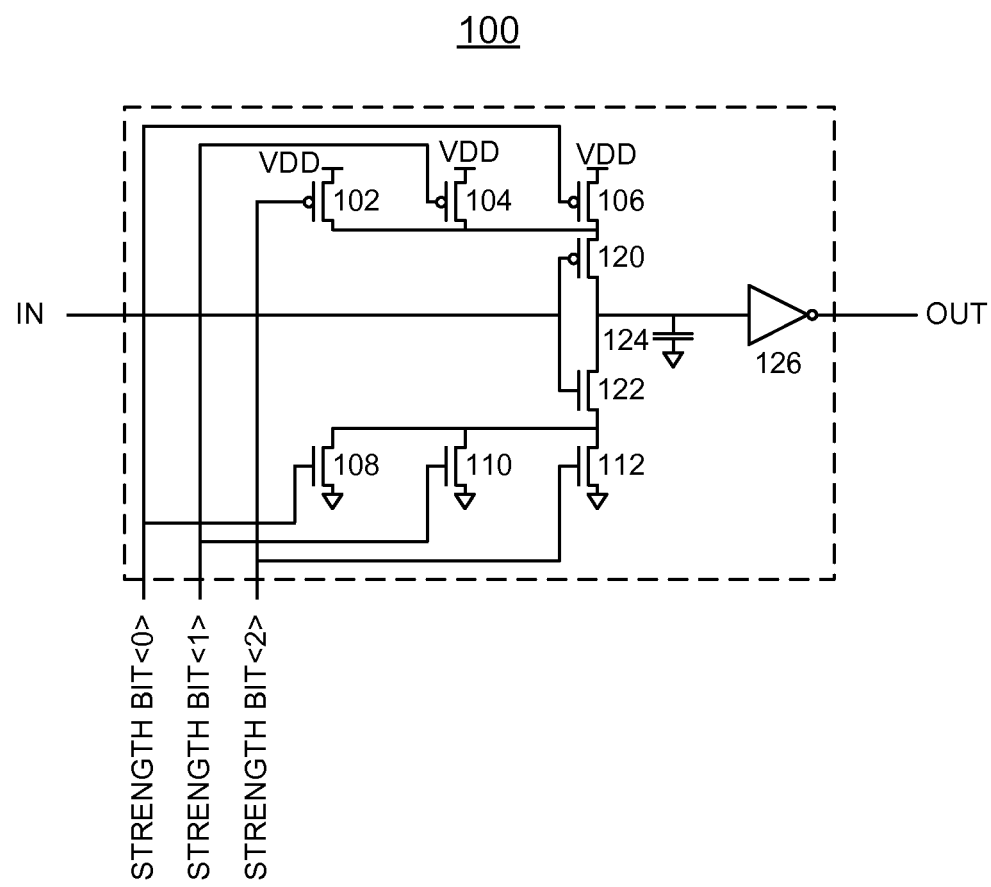
FIG. 1 is a schematic and block diagram representation illustrating an example circuit delay block for implementing hidden security key in Electronic Fuses (eFuses) in accordance with preferred embodiments.

Having reference now to the drawings, in FIG. 1, there is shown an example circuit delay block for implementing hidden security key in eFuses generally designated by the reference character 100 in accordance with a preferred embodiment. Circuit 100 is a programmable delay block designed to be sensitive to process, receiving an input IN and providing a delayed output OUT.

In accordance with features of the invention, circuit 100 includes a plurality of P-channel field effect transistors (PFETs) 102, 104, 106 and a plurality of N-channel field effect transistors (NFETs) 108, 110, 112, each PFET, NFET pair 102, 108; 104, 110, and 106, 112 receiving a respective strength bit gate input STRENGTH BIT <0>, STRENGTH BIT <1>, STRENGTH BIT <2>. The PFET, NFET pair 106, 112 are connected in series with a series connected PFET 120 and NFET 122 between a voltage supply VDD and ground. Circuit 100 includes a capacitor 124 and an inverter 126 connected to the common connection of PFET 120 and NFET 122. Inverter 126 providing the output OUT of circuit 100.

Figures 2A, 2B:
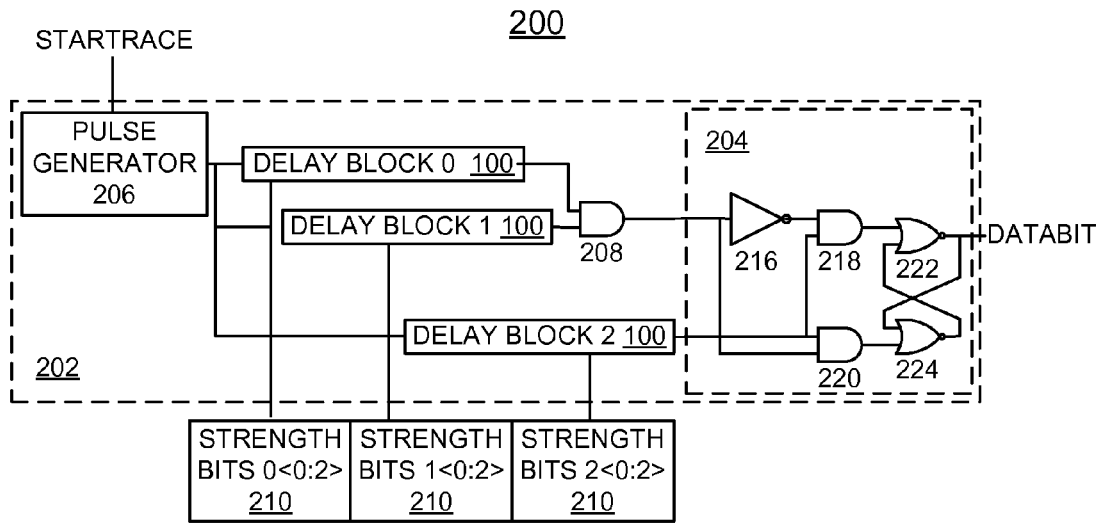
FIGS. 2A and 2B together provide a schematic and block diagram representation illustrating an example circuit data bit generator for implementing hidden security key in Electronic Fuses (eFuses) in accordance with preferred embodiments.

Referring now to FIGS. 2A and 2B, there is shown an example data bit generator circuit generally designated by the reference character 200 for implementing hidden security key in Electronic Fuses (eFuses) in accordance with preferred embodiments. The data bit generator circuit 200 includes a data bit generator 202 receiving a start race input and a data bit output provided by an edge-triggered D-latch flip flop 204. The start race input is applied to a pulse generator 206 coupled to each of a plurality of delay blocks 0-2, 100. Delay blocks 0-1, 100 provide respective inputs to a 2-input AND gate 208, which provides an input to the edge-triggered D-latch flip flop 204 and delay block 2, 100 provides an input to the edge-triggered D-latch flip flop 204. Each of the delay blocks 0-2, 100 receive respective strength bits 210, STRENGTH BITS 0 <0:2>, STRENGTH BITS 1 <0:2>, STRENGTH BIT 2 <0:2>.

The edge-triggered D-latch flip flop 204 includes for example, an inverter 216 receiving the output of AND gate 208, a pair of 2-input AND gates 218, 220, and a pair of cross coupled 2-input NOR gates 222, 224 receiving an output from the AND gates 218, 220. The AND gate 218 receives the outputs of inverter 216 and delay block 2, 100 and the AND gate 220 receives the outputs of AND gate 208 and delay block 2, 100. FIG. 2B provides a truth table illustrating the operation of the edge-triggered D-latch flip flop 204.

Figure 3:
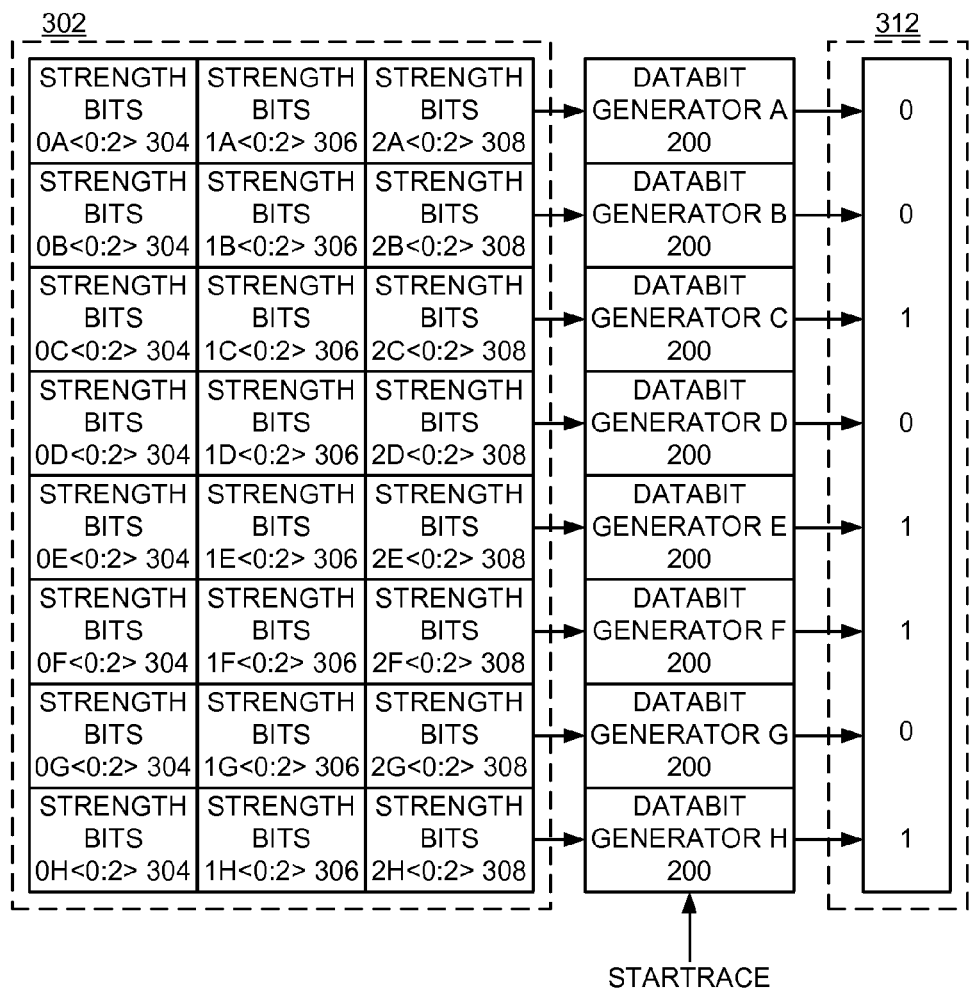
FIG. 3 is a schematic and block diagram representation illustrating an example race condition circuit where strength bits yield data bits via data generators for implementing hidden security key in Electronic Fuses (eFuses) in accordance with preferred embodiments.

Referring now to FIG. 3, there is shown an example race condition circuit generally designated by the reference character 300 where strength bits 302 yield data bits 312 via data generator circuits A-H, 200 receiving a start race input for implementing hidden security key in Electronic Fuses (eFuses) in accordance with preferred embodiments. Strength bits 302 are the strength bits actually store in eFuses. Strength bits 302 include strength bits 0A-0H, STRENGTH BITS <0:2> 304, strength bits 1A-1H, STRENGTH BITS <0:2> 306, and strength bits 2A-2H, STRENGTH BITS <0:2> 308. The strength bits 0A-0H, STRENGTH BITS <0:2> 304, strength bits 1A-1H, STRENGTH BITS <0:2> 306, and strength bits 2A-2H, STRENGTH BITS <0:2> 308 feed the respective data generator circuits A-H, 200 yielding the respective actual data bits 312. To implement voting, multiple, for example at least three sets of eFuses and their respective data bit generation blocks would feed a vote-determination circuit, which is standard in the art that outputs the actual data bit.

Figure 4:
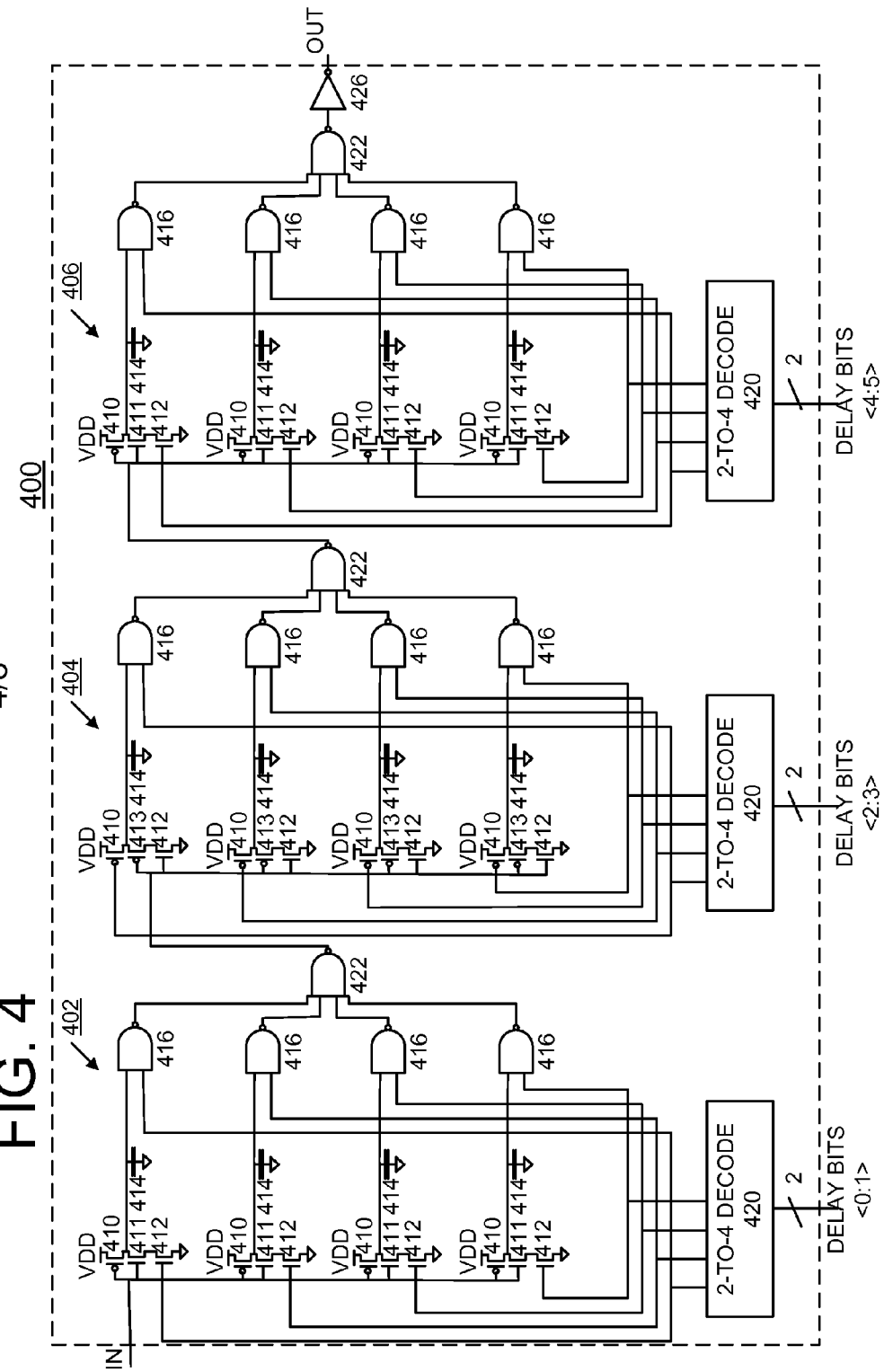
FIG. 4 is a schematic and block diagram representation illustrating another example circuit delay block for implementing hidden security key in Electronic Fuses (eFuses) in accordance with preferred embodiments.

Referring now to FIG. 4, there is shown another example delay block circuit generally designated by the reference character 400 for implementing hidden security key in Electronic Fuses (eFuses) in accordance with preferred embodiments. Circuit 400 is a programmable delay block designed to be sensitive to process, receiving an input IN and providing a delayed output OUT.

In accordance with features of the invention, circuit 400 includes a plurality of delay stages branches 402, 404, 406. Each delay branch 402, 406 includes a stack of three transistor inverters formed by a P-channel field effect transistor (PFET) 410 series connected with a pair of N-channel field effect transistor (NFETs) 411, 412 connected between a supply voltage VDD and ground together with a respective capacitor 414. Delay branch 404 includes a stack of three transistor inverters formed by a pair of P-channel field effect transistor (PFETs) 410, 413 series connected with an N-channel field effect transistor (NFET) 412 connected between a supply voltage VDD and ground together with a respective capacitor 414. Each of the three transistor inverters providing a first input to a 2-input NAND gate 416. A 2-to-4 decode 420 respectively receiving delay bits <0:1>, delay bits <2:3>, and delay bits <4:5> for delay branch 402, 404, 406 provides a second input to the 2-input NAND gate 416 The four NAND gates 416 in each delay branch 402, 404, 406 provide an input to a 4-input NAND gate 422. The 4-input NAND gate 422 of branch 402 provides an input to branch 404. The 4-input NAND gate 422 of branch 404 provides an input to branch 406. The 4-input NAND gate 422 of branch 406 provides an input to an output inverter 426 providing the delayed output OUT.

In accordance with features of the invention, each branch 402, 404, 406 has a unique and characterizable delay. The relative amount of delay is programmable via the respective 2-to-4 decode 420 respectively receiving delay bits <0:1>, delay bits <2:3>, and delay bits <4:5>, thus enabling control over the total delay through the delay block 400.

Figures 5A, 5B:
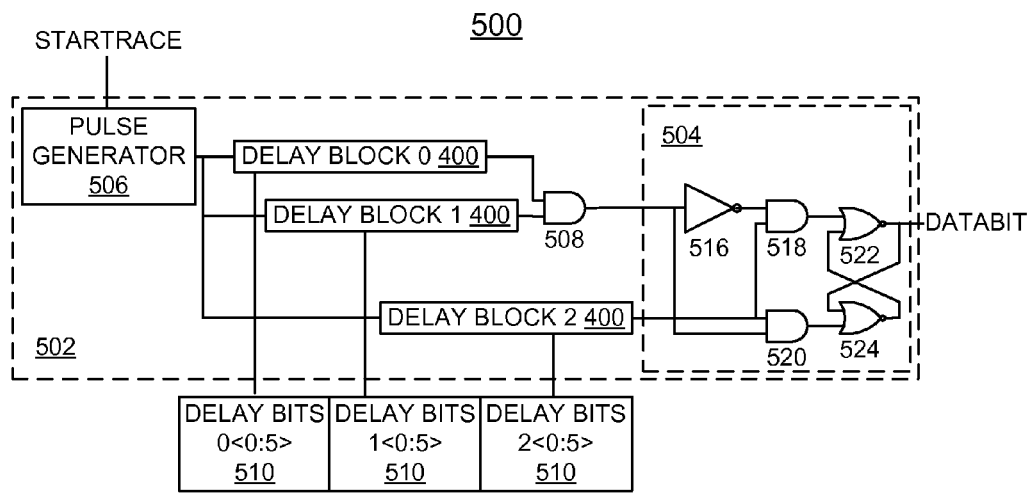
FIGS. 5A and 5B together provide a schematic and block diagram representation illustrating another example circuit data bit generator for implementing hidden security key in Electronic Fuses (eFuses) in accordance with preferred embodiments.

Referring now to FIGS. 5A and 5B, there is shown another example circuit data bit generator generally designated by the reference character 500 for implementing hidden security key in Electronic Fuses (eFuses) in accordance with preferred embodiments. The data bit generator circuit 500 includes a data bit generator 502 receiving a start race input and a data bit output provided by an edge-triggered D-latch flip flop 504. The start race input is applied to a pulse generator 506 coupled to each of a plurality of delay blocks 0-2, 400. Delay blocks 0-1, 400 provide respective inputs to a 2-input AND gate 508, which provides an input to the edge-triggered D-latch flip flop 504 and delay block 2, 400 provides an input to the edge-triggered D-latch flip flop 504. Each of the delay blocks 0-2, 400 receive respective delay bits 510, DELAY BITS 0 <0:5>, DELAY BITS 1 <0:5>, DELAY BIT 2 <0:5>.

The edge-triggered D-latch flip flop 504 includes for example, an inverter 516 receiving the output of AND gate 508, a pair of 2-input AND gates 518, 520, and a pair of cross coupled 2-input NOR gates 522, 524 receiving an output from the AND gates 518, 520. The AND gate 518 receives the outputs of inverter 516 and delay block 2, 400 and the AND gate 520 receives the outputs of AND gate 508 and delay block 2, 400. FIG. 5B provides a truth table illustrating the operation of the edge-triggered D-latch flip flop 504.

Figure 6:
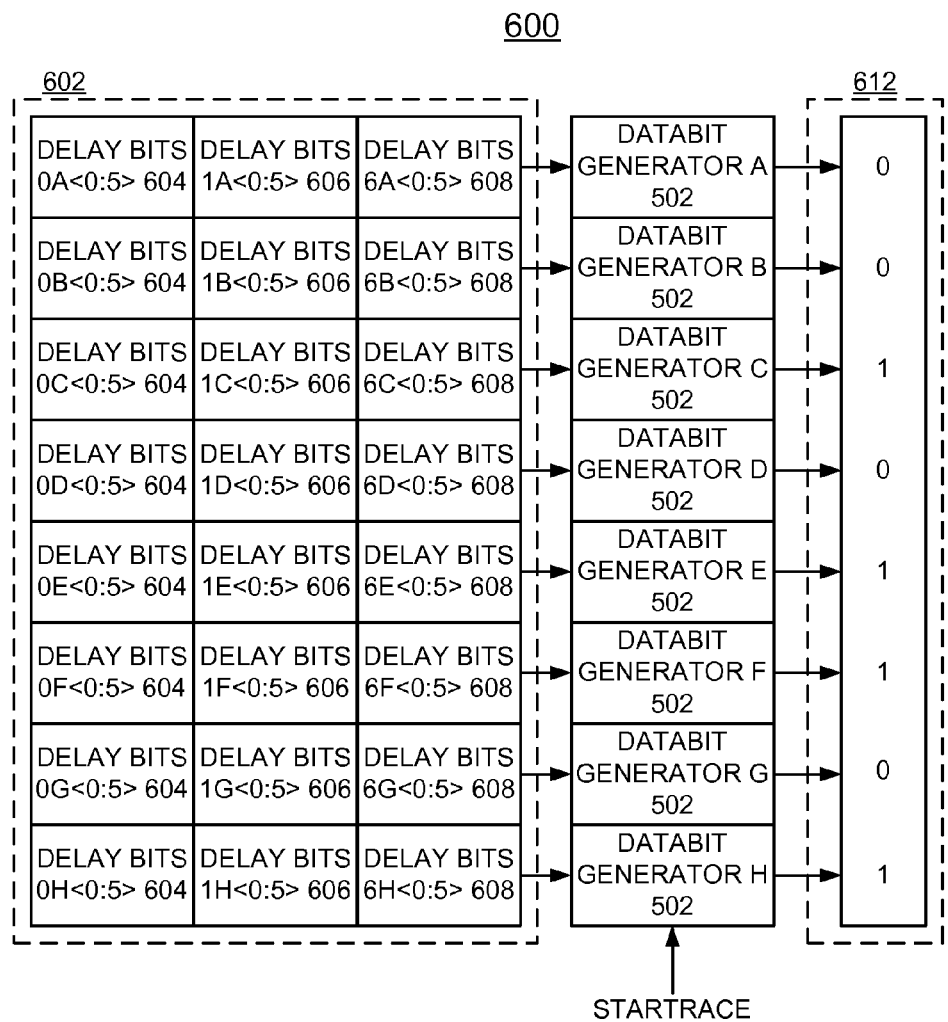
FIG. 6 is a schematic and block diagram representation illustrating another example race condition circuit where delay bits yield data bits via data bit generators for implementing hidden security key in Electronic Fuses (eFuses) in accordance with preferred embodiments.

Referring now to FIG. 6, there is shown an example race condition circuit generally designated by the reference character 600 where delay bits 602 yield data bits 612 via data generator circuits A-H, 502 receiving a start race input for implementing hidden security key in Electronic Fuses (eFuses) in accordance with preferred embodiments. Delay bits 602 are the delay bits actually stored in eFuses. Delay bits 602 include delay bits 0A-0H, DELAY BITS <0:2> 604, delay bits 1A-1H, DELAY BITS <0:2> 606, and delay bits 2A-2H, DELAY BITS <0:2> 608. The delay bits 0A-0H, DELAY BITS <0:2> 604, delay bits 1A-1H, DELAY BITS <0:2> 606, and delay bits 2A-2H, DELAY BITS <0:2> 608 feed the respective data generator circuits A-H, 502 yielding the respective actual data bits 612. To implement voting, multiple, for example at least three sets of eFuses and their respective data bit generation blocks would feed a vote-determination circuit, which is standard in the art that outputs the actual data bit.

Figure 7:
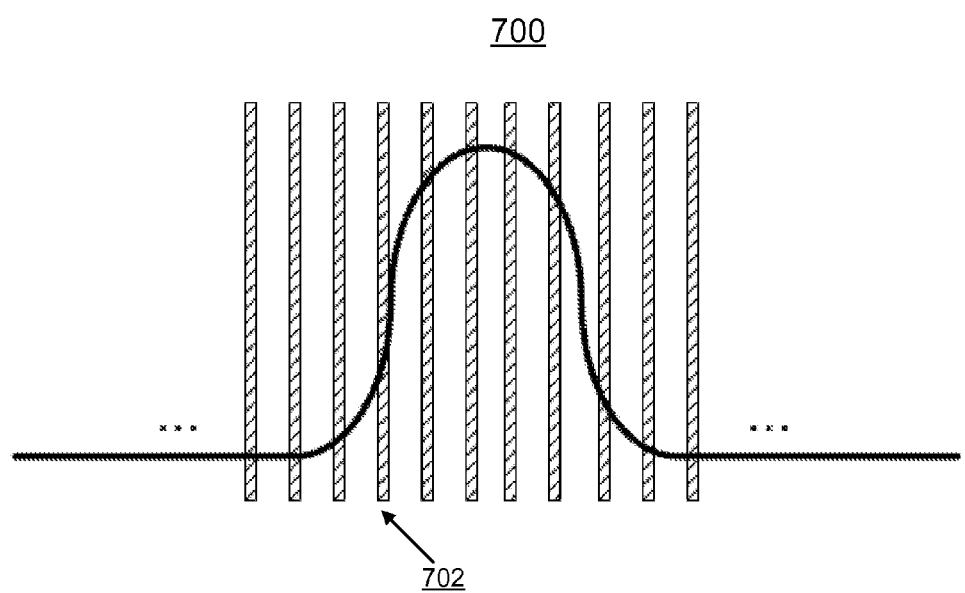
FIG. 7 illustrates operation of how the example race condition circuits of FIGS. 3 and 6 generate a 1 or 0 in accordance with a preferred embodiments.

Referring now to FIG. 7, there is shown operation of how the example race condition circuits of FIGS. 3 and 6 generate a 1 or 0 in accordance with preferred embodiments. As indicated by arrow 702, the 1 or 0 is generated for the race condition circuits 300, 600.

Figure 8:
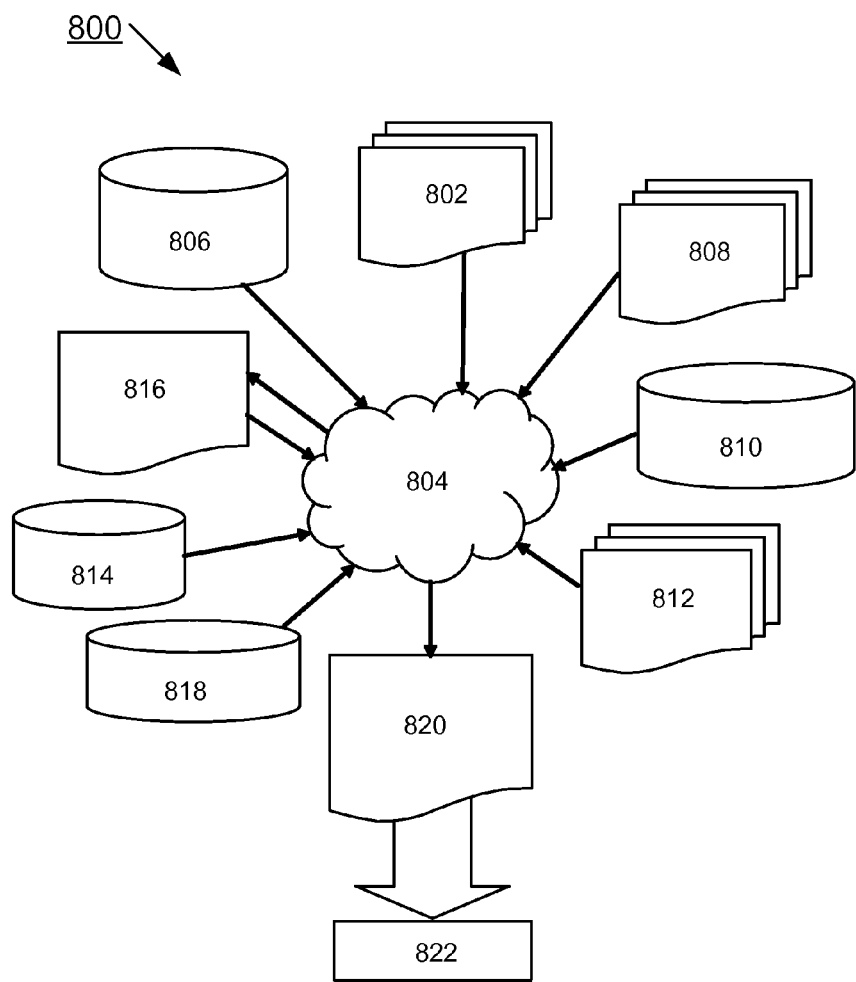
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuits 100, 200, 300, and circuits 400, 500, 600 in the form of schematics or HDL, a hardware-description language, for example, Verilog, VHDL, C, and the like. Design structure 802 may be contained on one or more machine readable medium. For example, design structure 802 may be a text file or a graphical representation of circuit 300. Design process 804 preferably synthesizes, or translates, circuits 100, 200, 300, and circuits 400, 500, 600 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the circuit.

Design process 804 may include using a variety of inputs; for example, inputs from library elements 808 which may house a set of commonly used elements, circuits, and devices, including models, layouts, and symbolic representations, for a given manufacturing technology, such as different technology nodes, 22 nm, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 1, 2A, 2B, 3 and FIGS. 4, 5A, 5B, 6, along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2A, 2B, 3 and FIGS. 4, 5A, 5B, 6. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A circuit for implementing a hidden security key in Electronic Fuses (eFuses), said circuit comprising:
   a data bit generator including a plurality of delay blocks coupled to a latching structure; said data bit generator receiving respective bit inputs for each delay block and a sampling clock and providing a data bit output;
   a race condition circuit being characterized during chip testing including a plurality of said data bit generators receiving a start race input and respective multiple driver strength bits and yielding a plurality of output data bits.

2. The circuit as recited in claim 1 wherein each of said plurality of delay blocks receive an input and provide a programmable delay output.

3. The circuit as recited in claim 2 wherein each of said plurality of delay blocks includes a plurality of P-channel field effect transistors (PFETs) and a plurality of N-channel field effect transistors (NFETs), a respective PFET, NFET receiving a respective strength bit gate input.

4. The circuit as recited in claim 2 wherein each of said plurality of delay blocks includes a plurality of plurality of delay branches, each delay branch includes a stack of three transistor inverters, each inverter having a respective capacitor and coupled to a 2-input NAND gate, each inverter providing a first NAND gate input, and a decode providing a second NAND gate input, said receiving a respective delay bits input.

5. The circuit as recited in claim 4 further includes a 4-input NAND gate receiving an input from each said 2-input NAND gate and providing a unique and characterizable delay output.

6. The circuit as recited in claim 1 wherein said respective multiple driver strength bits are used to store drive strengths for each stage in eFuse.

7. A design structure embodied in a non-transitory machine readable medium used in a design process, the design structure comprising:
 a circuit tangibly embodied in the non-transitory machine readable medium used in the design process, said circuit for implementing a hidden security key in Electronic Fuses (eFuses), said circuit comprising:
 a data bit generator including a plurality of delay blocks coupled to a latching structure; said data bit generator receiving respective bit inputs for each delay block and a sampling clock and providing a data bit output;
 a race condition circuit being characterized during chip testing including a plurality of said data bit generators receiving a start race input and respective driver strength bits and yielding a plurality of output data bits, wherein the design structure, when read and used in the manufacture of a semiconductor chip produces a chip comprising said circuit.

8. The design structure of claim 7, wherein the design structure comprises a netlist, which describes said circuit.

9. The design structure of claim 7, wherein the design structure resides on storage medium as a data format used for the exchange of layout data of integrated circuits.

10. The design structure of claim 7, wherein the design structure includes at least one of test data files, characterization data, verification data, or design specifications.

11. The design structure of claim 7, wherein each of said plurality of delay blocks receive an input and provide a programmable delay output.

12. The design structure of claim 11, wherein each of said plurality of delay blocks includes a plurality of P-channel field effect transistors (PFETs) and a plurality of N-channel field effect transistors (NFETs), a respective PFET, NFET receiving a respective strength bit gate input.

13. The design structure of claim 11, wherein each of said plurality of delay blocks includes a plurality of plurality of delay branches, each delay branch includes a stack of three transistor inverters, each inverter having a respective capacitor and coupled to a 2-input NAND gate, each inverter providing a first NAND gate input, and a decode providing a second NAND gate input, said receiving a respective delay bits input.

14. The design structure of claim 13, further includes a 4-input NAND gate receiving an input from each said 2-input NAND gate and providing a unique and characterizable delay output.

15. The design structure of claim 7, wherein said respective multiple driver strength bits are used to store drive strengths for each stage in eFuse.

\* \* \* \* \*